(12) United States Patent
Corella

(10) Patent No.: US 8,341,200 B2
(45) Date of Patent: Dec. 25, 2012

(54) PROTECTING A WEB APPLICATION AGAINST ATTACKS THROUGH SHARED FILES

(75) Inventor: Francisco Corella, San Diego, CA (US)

(73) Assignee: Pomian & Corella, LLC, San Diego, CA (US)

( * ) Notice: Subject to any disclaimer, the term of this patent is extended or adjusted under 35 U.S.C. 154(b) by 360 days.

(21) Appl. No.: 12/356,350

(22) Filed: Jan. 20, 2009

(65) Prior Publication Data

US 2009/0313261 A1 Dec. 17, 2009

Related U.S. Application Data

(60) Provisional application No. 61/061,107, filed on Jun. 12, 2008.

(51) Int. Cl.
*G06F 17/30* (2006.01)
*G08B 23/00* (2006.01)

(52) U.S. Cl. ........... 707/952; 707/782; 726/22; 709/239

(58) Field of Classification Search .................. 707/705, 707/770, 781, 782, 999.01, 952, 999.001; 709/217, 219, 224, 232, 239; 726/7, 27, 726/22, 23, 24, 25, 2, 5, 26; 717/127, 131, 717/136, 141, 142, 154, 172, 173, 178
See application file for complete search history.

(56) References Cited

U.S. PATENT DOCUMENTS

| | | | |
|---|---|---|---|
| 5,546,528 A | 8/1996 | Johnston | |
| 6,842,861 B1 * | 1/2005 | Cox et al. | 713/188 |
| 7,131,006 B1 * | 10/2006 | Carroll | 713/171 |
| 7,137,006 B1 * | 11/2006 | Grandcolas et al. | 713/180 |
| 7,457,848 B2 * | 11/2008 | Kon | 709/217 |
| 2005/0108361 A1 * | 5/2005 | Scott et al. | 709/217 |
| 2006/0185021 A1 * | 8/2006 | Dujari et al. | 726/27 |
| 2007/0174915 A1 * | 7/2007 | Gribble et al. | 726/24 |
| 2007/0250715 A1 * | 10/2007 | Cai et al. | 713/176 |
| 2008/0133540 A1 * | 6/2008 | Hubbard et al. | 707/10 |
| 2008/0222712 A1 * | 9/2008 | O'Connell et al. | 726/7 |
| 2008/0263650 A1 * | 10/2008 | Kerschbaum | 726/9 |
| 2008/0263659 A1 * | 10/2008 | Alme | 726/22 |
| 2009/0070872 A1 * | 3/2009 | Cowings et al. | 726/23 |
| 2009/0083860 A1 * | 3/2009 | Nathan et al. | 726/28 |
| 2010/0005531 A1 * | 1/2010 | Largman et al. | 726/24 |

OTHER PUBLICATIONS

Morris et al., SearchBar: A Search-Centric Web History for Task Resumption and Information Re-Finding, CHI 2008, 10 pgs., Apr. 2008.
Morris et al., SearchTogether: An Interface for Collaborative Web Search, UIST '07, 2007, 10 pgs., Oct. 2007.
Web Security, How to avoid XSS into PDF Files, using java, email from Brian, May 18, 2007, 2 pages.
Doctype, Article Untrusted Downloads, comment by Simon B., May 19, 2008, 2 pages.
Web Security, Re: countermeasure against attacks through HTML share files, Revision 1.27, Aug. 18, 2001, 3 pages.
GERV.NET, Content Restrictions, Mar. 20, 2007, 4 pages.

* cited by examiner

*Primary Examiner* — Greta Robinson

(57) ABSTRACT

A method of downloading a file from a Web application to a client computer equipped with a Web browser including: the Web browser sending an original request to download the file to a first front server, the original request being addressed to a URL comprising a hostname portion that is independent of the file, the first front server sending a redirection response to the original request, the response specifying a URL comprising a hostname portion that is dependent on the file, the Web browser sending a follow-up request to download the file to a second front server, the follow-up request being addressed to the URL specified in the redirection response, and the second front server downloading the requested file in response to the follow-up request.

17 Claims, 13 Drawing Sheets

```
Set-Cookie: B=0391990f7778e80370fb3b7435525d6256086e9c; secure; httponly
             _____/  \____/  _____/
                              1930                          1940    1950
             \__/
             1920
                                                                      ↖
                                                                       ─1910
```

```
https://application-42.pomcor.com/welcome/16cad3d1ed07bc91a882c7bf48dbce8268239d2f
         \____/\__/\__/  \_____/                  _____/
          2220  2040 2030  2060                                2070          2050
                                                                               ↖
                                                                                ─2010
```

PROTECTING A WEB APPLICATION AGAINST ATTACKS THROUGH SHARED FILES

CROSS-REFERENCE TO RELATED APPLICATION

The subject matter of this application is related to the subject matter of U.S. Provisional Patent Application No. 61/061,107, filed on Jun. 12, 2008, priority to which is claimed under 35 U.S.C. §119(e) and which is incorporated herein by reference.

BACKGROUND

Many Web applications have a file-sharing feature that allows users to share files by uploading them to, and downloading them from, a Web-accessible file repository. Some Web applications provide file-sharing as their only purpose, while others provide file-sharing as one of several collaboration tools. Examples of the former include those provided by My Docs Online (available at mydocsonline.com) and Box.net. Examples of the latter include Yahoo Groups (available at groups.yahoo.com) and a file-sharing application provided by Webex (available at webex.com).

A Web application with a file-sharing feature may be implemented using a single computer, or multiple interconnected computers. One or more computers used by the Web application are Web server computers that accept HTTP requests sent over the internet, either in plain text, or over an encrypted SSL/TLS connection. Such a Web server computer is hereinafter referred to as a "front server" (even if the application is implemented using a single computer). To download a file from the file repository of the application, a user uses a client computer equipped with a Web browser to send an HTTP request to a front server of the application. The request is addressed to a Uniform Resource Locator (URL). The URL has a hostname portion that is mapped by the Internet domain name system (DNS) to an Internet Protocol (IP) address, causing to request to be routed to a front server to which the IP address has been assigned. By configuring or programming a name server within the DNS, the application provider controls what requests are routed to what front servers.

Web applications with a file-sharing feature commonly have multiple instances. Each instance has its own file repository and its own group of instance users who are allowed to access the file repository. For example, an instance of the Yahoo Groups application is a particular Yahoo Group. (Such instances are sometimes referred to as "virtual application instances", to distinguish them from "physical application instances", which are independent implementations of the same application; but physical application instances need not be further discussed herein, and the term "application instance" hereinafter refers to a "virtual application instance".)

Henceforth the term "user", unqualified, shall mean "application instance user"; the term "user file" shall refer to a file uploaded by a user to the file repository of an application instance; and the term "shared file" shall be synonymous with "user file".

When a user downloads a user file from an instance repository, using a Web browser running on a client computer, the file may be saved to disk, opened by an application running on the client computer, or displayed by the browser. HTML files, in particular, may be displayed by the browser. An HTML file may contain client-side code, such as scripts written in JavaScript, Java applets, or ActiveX controls. Client-side code contained in an HTML file may be executed when the file is displayed by the browser.

The fact that HTML user files can be directly displayed by the browser and may contain client-side code is a valuable feature. But it is also dangerous, because it makes the Web application vulnerable to attacks through client-side code contained in user files uploaded by malicious users ("cross-user attacks"). There are two types of cross-user attacks: cross-user spoofing attacks, and cross-user scripting attacks.

When an HTML user file is displayed, the address box of the browser (a.k.a. the address bar or the location bar) shows a URL used to download the file. Since the file is downloaded from a Web server belonging to the organization that provides the application, the URL has a hostname portion that belongs to a DNS domain owned by the provider. This may allow a malicious user to upload an HTML file that, when downloaded by a second user, masquerades as a page pertaining to the Web interface of the application (an "application page") or to the Web site of the provider (a "site page"). It could, for example, masquerade as a login page, tricking the second user into entering his/her login credentials, which may then be sent to the malicious user by client-side code in the HTML user file. This type of attack is hereinafter referred to as a "cross-user spoofing attack".

The "domain" of a file or Web page downloaded from the Web is defined by the entire hostname portion of the URL used to download the file. The file or page is said to belong to, or originate from, that domain. Client-side code contained in the file is also said to belong to, or originate from, the domain of the file.

The "same-origin policy" followed by Web browsers (cf. http://en.wikipedia.org/wiki/Same_origin_policy) prevents client-side code contained in an HTML user file of an application instance from accessing the contents of files or Web pages originating from a domain other than its own. But, if no precautions are taken, the HTML user file may belong to the same domain as site pages, application pages and other user files of the same application instance or other instances of the same application.

Thus, an attacker who is a user of an application instance may upload an HTML user file containing malicious client-side code ("malicious file"). When the malicious file is downloaded by a second user of the same instance ("victim user"), the malicious client code may take advantage of one or more authentication cookies set in the victim user's browser to run under the identity and with the privileges of the victim user for the benefit of the attacker ("cross-user scripting attack").

The malicious code may be able to access application pages and obtain data that the victim user is entitled to see but the attacker is not, and may send such data to the attacker; in particular, it may be able to obtain the values of so-called hidden input fields of HTML forms used by the application to protect against cross-site request forgery (CSRF) attacks (cf. http://en.wikipedia.org/wiki/Cross-site_request_forgery), and then use those values to submit forms to the application under the identity and with the privileges of the victim user ("cross-user impersonation attack").

If the Web application implements a system of file permissions, the malicious code may be able to access a protected file that the victim user, but not the attacker, is permitted to access, and may communicate the contents of the protected file to the attacker ("protected file attack").

The malicious file may be downloaded, and thus the attack may continue, even after the attacker's authorization to use the application instance has been revoked and the attacker is no longer a user of the instance ("ex-user scripting attack").

Furthermore, if the second user is also a user of a second instance, the attacker may be given access to that instance as well by the malicious code uploaded to the first instance ("cross-instance scripting attack").

Files other than HTML files may also contain client-side code that is automatically executed by a Web browser when such a file is displayed by the browser. This is the case, e.g., for PDF files containing JavaScript code, or SWF files containing ActionScript code. One way of preventing cross-user scripting attacks is to limit file sharing to types of files, such as image files, that do not contain automatically executed client-side code. This, however, is a severe limitation. Furthermore, the limitation may be ineffective for browsers that practice "content sniffing", notably Internet Explorer (IE). To "sniff the content" of a file means to heuristically determine the type of the file by examining its content, ignoring the type explicitly declared in an HTTP Content-Type header by the front server that downloads the file and the type implied by the file name extension. A malicious file containing HTML data including malicious client-side code may overcome the limitation by masquerading as an image file: the malicious user declares the file to be an image file when the file is uploaded; the front server that downloads the file declares it to be an image file; but the browser that receives the file sniffs its content, decides that it is an HTML file, and executes the malicious script. (The latest version of Internet Explorer, IE8, has introduced an HTTP header, "X-Content-Type-Options" that addresses this issue: the front server can add this header with value "nosniff" to prevent content-sniffing by the browser.)

Another way of preventing cross-user scripting attacks is to prevent browsers from displaying user files as they are downloaded. This is however a severe limitation on the functionality of the Web application, as files such as HTML or PDF files are meant to be displayed directly by the browser, and users expect this to happen. Furthermore, it is not possible to reliable prevent all browsers from displaying a file as it is downloaded. The front server that downloads the file can prevent IE8 from displaying the file by using a "Content-Disposition" HTTP header with value "attachment" and a "X-Download-Options" HTTP header with value "noopen"; but the "X-Download-Options" header is not recognized by earlier versions of IE.

Cross-user scripting attacks can be considered to be a special case of cross-site scripting attacks (XSS). The traditional defense against a XSS attack is to remove malicious scripts from HTML content, or to disable the scripts by HTML-encoding certain characters (e.g., the character "<" is HTML-encoded by replacing it with the string "C;"). These defenses, however cannot be used to prevent cross-user scripting attacks through shared files because that would require the Web application to modify shared files, which it is not expected to do.

An alternative defense against XSS has been proposed for the case where HTML content that may contain malicious scripts ("untrusted content") cannot be modified. The alternative defense consists of using a different hostname to download untrusted content; i.e., to address requests for untrusted content to a URL whose hostname portion is different from the hostname portion of a URL used to download other content. This alternative defense is briefly mentioned in a few places on the Web:

Jesse Ruderman suggests it in a Web page entitled "Security Tips for Web Developers", available at http://www.squarefree.com/securitytips/web-developers.html;

Brian Eaton suggested it in an email message to the Web Security mailing list dated May 18, 2007, available in the list archive at http://www.webappsec.org/lists/web-security/archive/2007-05/msg00087.html; and Simon Bohlin suggested it in a comment dated May 19, 2008 on a Google article entitled "ArticleUntrustedDownloads" (sic), which was evidently incorporated into the article; the article and the comment can be found at http://code.google.com/p/doctype/wiki/ArticleUntrustedDownloads.

In the context of a Web application with a file sharing feature, the alternative defense would consist of using different hostnames to download user files and application pages. Malicious code in a user file would then have no access to application pages. It would still, however, have access to other user files. Furthermore, the traditional means of authenticating requests using an authentication cookie would not work for user files, since a Web browser would not send the authentication cookie along with a request that targets a URL with a different hostname portion. User files would thus be unauthenticated and directly accessible by an attacker without any need to embed a malicious script in a user file.

A variation on the alternative defense is to use a different port number instead of a different hostname. This was done in the Acmemail Webmail project in 2001, as reported by Peter Watkins in an email message to the Web Security mailing list, available in the list archive at http://www.webappsec.org/lists/websecurity/archive/2008-11/msg00032.html.

This inventor conducted an informal survey of Web applications having a file sharing feature in May 2007. The following applications (identified by the names of the domains where they can be found) were included in the survey: groups.yahoo.com, sharefile.com, webex.com, box.net, mydocsonline.com, httpd-com.com, filesanywhere.com, file-works.com, punchwebgroups.com, and biscu.com. The survey found the following:

The Yahoo Groups application at groups.yahoo.com uses the hostname groups.yahoo.com to download application pages, while using a variety of domain names, all ending in ".yahoofs.com", to download user files. The application is protected against cross-user impersonation attacks; but access to user files is not authenticated, even though the user files of a group are supposed to be available only to members of the group. To mitigate the risk that non-group-members may gain access to user files, the URL of a user file contains a very long path segment that is hard to guess. This, however, does not eliminate the risk; and it has usability drawbacks: the long path segment makes it awkward to use the URL to construct a link to the file, and makes it impossible to remember the URL.

Two of the applications, sharefile.com and webex.com, were found to use the same hostname portion in user file URLs and application pages URLs, while embedding an application instance ID in the hostname. Because of the application instance ID, these applications should be protected against cross-instance attacks. On the other hand, because the same hostname is used for user files and application pages, it is likely that they are not protected against other cross-user scripting attacks, including ex-user attacks, cross-user impersonation attacks and, if applicable, protected file attacks; nor against cross-user spoofing attacks.

The remaining seven applications in the survey were found to use a single hostname for the URLs of user files and application pages of all application instances. They are thus likely to be unprotected against all the types of cross-user attacks described above.

The present embodiments enable protection of a Web application having a file sharing feature against cross-user attacks without sacrificing usability. It has evolved over a period of time, and elements of it have been published and publicly discussed:

- a first Provisional Patent Application, No. 60/934,270, filed on Jun. 12, 2007 but not made public at that time, disclosed some elements of the present embodiments;
- a first white paper, based on the first Provisional Patent Application, entitled "Collaborative File Sharing Security: Attacks and Countermeasures" was published on Jan. 17, 2008, by being posted on the Pomcor Web site (www.pomcor.com);
- a second Provisional Patent Application, No. 61/061,107 (cross-referenced above by this patent application) was filed on Jun. 12, 2008;
- a second white paper entitled "Protecting a Web Application Against Attacks Through HTML Shared Files", based on the second Provisional Patent Application, was published in November 2008;
- an email message announcing the second white paper was sent by this inventor to the Web Security mailing list (websecurity webappsec.com) and the Bugtraq mailing list (bugtraq@securityfocus.com) on Nov. 7, 2008; this resulted in an online discussion of the merits of the present embodiments and of related prior art. The complete discussion can be found in the November 2008 archive of the Web Security mailing list, available at http://www.webappsec.org/lists/websecurity/archive/2008-11/, under the thread name "countermeasure against attacks through HTML shared files".

SUMMARY

According to one embodiment, a method of protecting a Web application having a file sharing feature against attacks through shared files includes receiving a file download request addressed to a standard user-file URL that includes an application instance ID, creating a file retrieval session, extending the hostname portion of the standard URL with the session ID of the file retrieval session, and redirecting the request to the extended URL. The file retrieval session ID authenticates the redirected request, and leverages the same-origin policy to prevent any malicious script embedded in the file from accessing the contents of other user files or application pages, thus providing protection against cross-user scripting attacks including protected-file attacks, ex-user attacks, cross-user impersonation attacks, and cross-instance attacks. The hostname portion of the standard URL, on the other hand, is file-independent. Hence HTML files in the file repository of an application instance can refer to each other using relative URLs, making it easy to build a private Web site in the instance repository.

The present embodiments protect a Web application having a file sharing feature against cross-user attacks without sacrificing usability and provide at least the following benefits:

- protection against cross-user spoofing attacks, and against all varieties of cross-user scripting attacks, including ex-user attacks, protected-file attacks, cross-user impersonation attacks and cross-instance attacks;
- authentication for user files;
- the protections provided by the present embodiments do not rely on restricting the type of files that can be shared, and is thus available for the sharing of unmodified HTML files, PDF files and other files that may contain client-side code;
- the protections provided by the present embodiments do not rely on preventing files from being displayed by the browser as they are downloaded;
- user files can be referenced using short URLs that do not contain authentication information; and
- user files stored in the file repository of an application instance can refer to each other using relative URLs.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Reference numerals consist of the concatenation of a one- or two-digit figure number followed by a two digit number that locates the referenced part within the figure. Once a reference numeral has been introduced in a figure, it may be used in subsequent figures to refer to the same part or a similar part.

DETAILED DESCRIPTION

In the following Detailed Description, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense.

It is to be understood that the features of the various exemplary embodiments described herein may be combined with each other, unless specifically noted otherwise.

Figure 1:
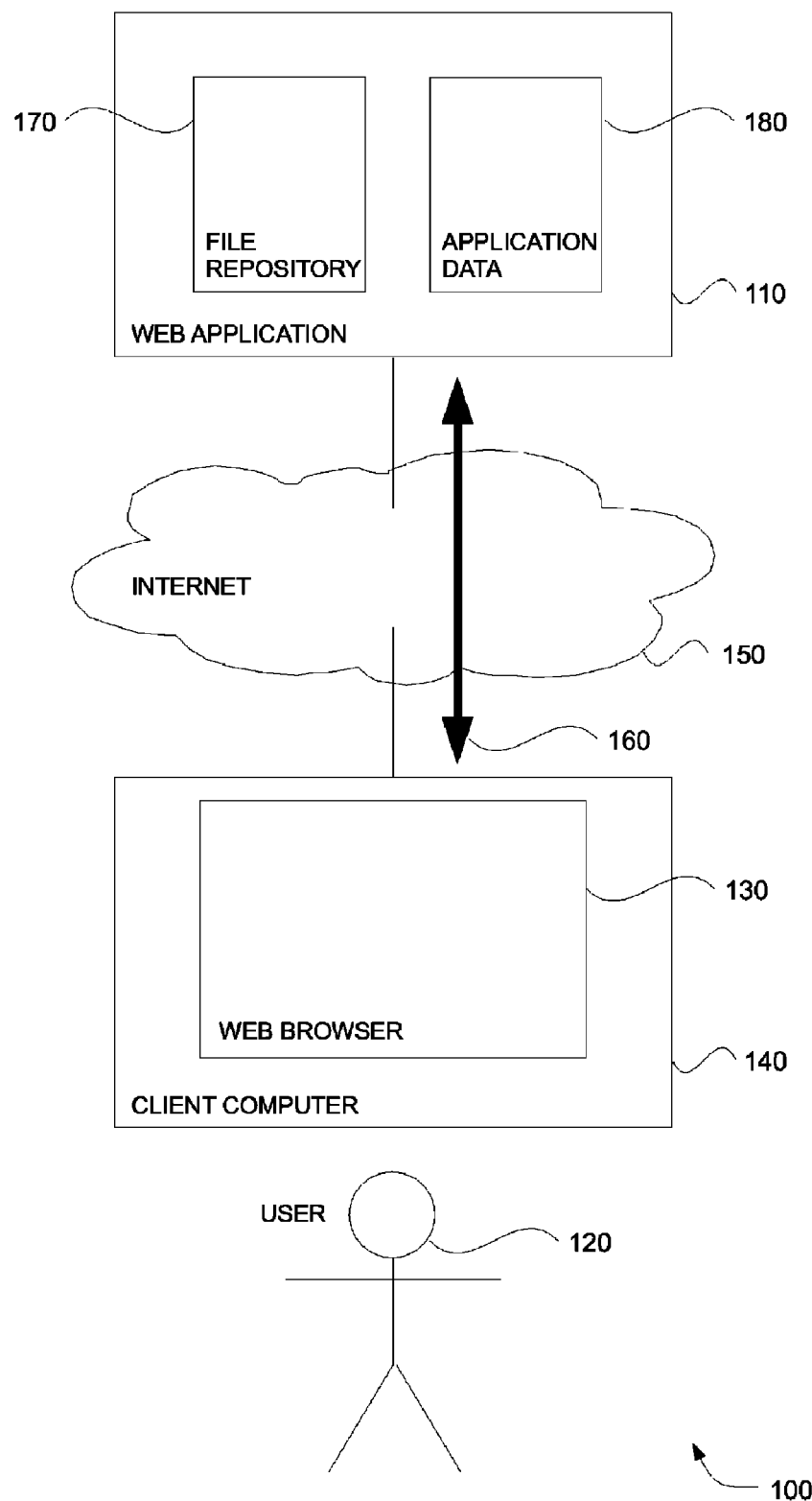
FIG. 1 is a block diagram generally illustrating an example of a system for operating a Web application having a file sharing feature and employing techniques to prevent attacks through shared files according to embodiments described herein.

FIG. 1 is a block diagram generally illustrating an example of a system 100 for operating a Web application 110 having a file sharing feature and employing techniques to prevent attacks through shared files according to embodiments described herein. A user 120 uses a Web browser 130 running on a client computer 140 to communicate with the application 110 over the Internet 150. The Web browser communicates with the application by sending HTTP requests, such as GET requests and POST requests, over an SSL/TLS connection 160. The Web application contains a file repository 170. Users can share files by uploading them to, and downloading them from, the repository. In one embodiment, the application 110 comprises a plurality of application instances, and the file repository 170 comprises a file repository for each instance.

The Web application further contains application data 180, which it uses for the purpose of processing login requests, establishing login sessions, authenticating HTTP requests, and other purposes.

Figure 2:
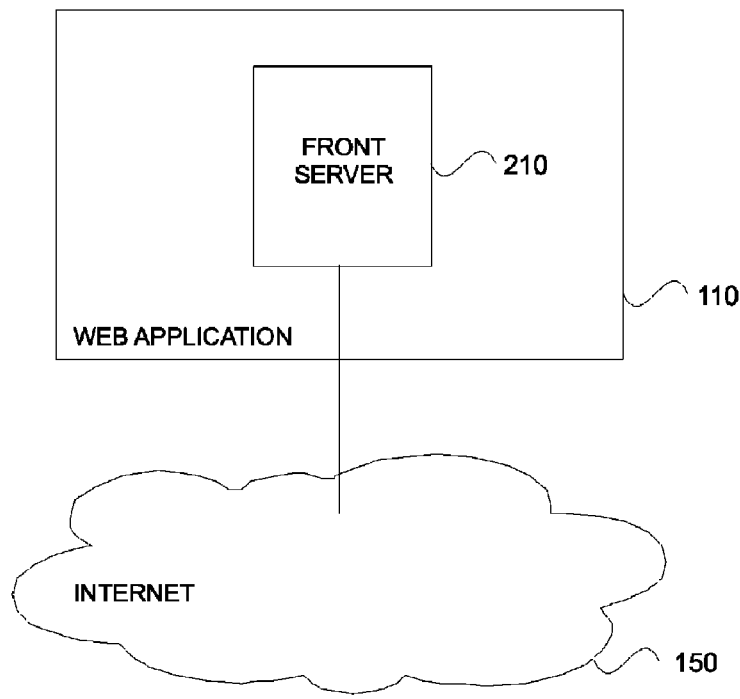
FIG. 2 is a block diagram illustrating a Web application implemented using a single server computer.
Figure 3:
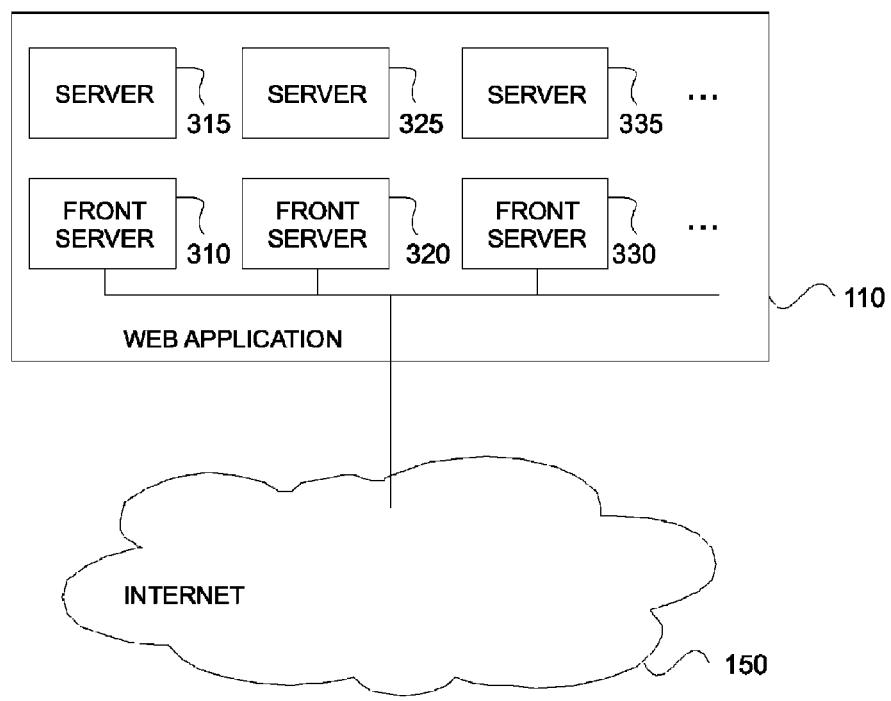
FIG. 3 is a block diagram illustrating a Web application implemented using a plurality of server computers.

In one embodiment, shown in FIG. 2, the Web application 110 is implemented using a single server computer 210, which is a front server directly accessible from the Internet 150. In an alternative embodiment, shown in FIG. 3, the Web application 110 is implemented using a plurality of interconnected server computers 310, 315, 320, 325, 330, 335, . . . , one or more of which 310, 320, 330, . . . , are front servers directly accessible from the Internet 150.

In one embodiment, the application 110 uses four kinds of URLs, each of which uses a different format for its hostname portion.

The first kind of URL is a "site URL", which is the Web address of a site page, and whose hostname portion is a "site hostname". In one embodiment, the application 110 has a plurality of application instances and a site URL is the target of an HTTP request that is not associated with any particular instance of the application, for example a GET request to retrieve a login page that is not instance-specific, or a POST request to submit the login form contained in such a login page.

Figure 4:
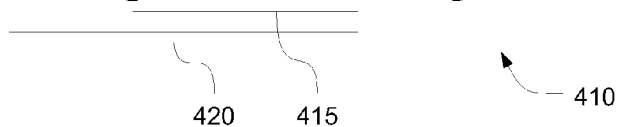
FIG. 4 is an example of a site URL according to one embodiment.

FIG. 4 shows an example of a site URL 410, viz. the URL of a login page, and its hostname portion 420. The hostname portion includes the domain name 415 of the application provider, "pomcor.com" in the example.

The second kind of URL is an "application-page URL", which is the Web address of an application page, and whose hostname portion is an "application-page hostname". In one embodiment, the application 110 has a plurality of application instances and an application-page URL targets a particular application instance and results in the browser displaying an application page rather than downloading a user file.

Figure 5:
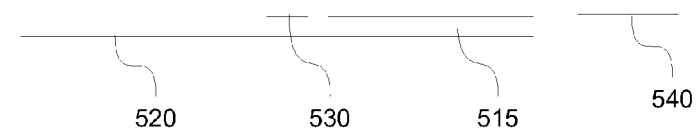
FIG. 5 is an example of an application-page URL according to one embodiment.

FIG. 5 shows an example of an application-page URL 510 and its hostname portion 520. The hostname portion includes the domain name 515 of the application provider, "pomcor.com" in the example. It also includes a reference to an application instance, viz. an application instance number 530, which, in the example, is the number "42". The hostname portion 520 is referred to as "the application-page hostname of instance 42". The URL also has a path portion 540, which specifies a particular action to be performed by the application, or particular data to be displayed in the application page. In the example, the path 540 asks the application to show the list of files present in the file repository of application instance 42.

The third kind of URL is a "standard user-file URL", whose hostname portion is a "standard user-file hostname". The fourth kind of URL is an "extended user-file URL", whose hostname portion is an "extended user-file hostname". To download a user file, a user issues a first GET request that targets a standard user-file URL ("the original user-file request"). The application responds with a redirect response, asking the user's browser to issue a second GET request that targets an extended user-file URL ("the follow-up user-file request").

Figure 6:
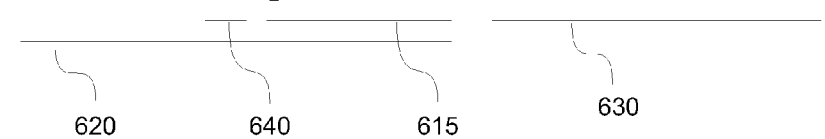
FIG. 6 is an example of a standard user-file URL according to one embodiment.

FIG. 6 shows an example of a standard user-file URL 610, having a hostname portion 620 and a path portion 630.

The hostname portion 620 contains the domain name 615 of the application provider, "pomcor.com" in the example. It also contains a reference to an application instance, viz. an application instance number 640, which, in the example, is again the number "42". The hostname portion 620 is referred to as "the standard user-file hostname of instance 42". It begins with the string "userfiles", which indicates clearly that such a hostname is used to retrieve a user file. As will be described in greater detail below, because user files may masquerade as application pages, one embodiment enables users to recognize a user file and an application page by the hostname portions of their URLs, which are displayed in the address box of the browser.

The path portion 630 consists of a sequence of one or more "segments" separated by forward slashes. In one embodiment, the path portion is a "true file path" that identifies a particular file in the file repository of the application instance. In a true file path, the final segment is the file's name, and the segments preceding the file name, if any, are the names of file folders. The path 630 in FIG. 6 is a true file path that identifies a file named "doc1.txt" in a folder named "documents".

In one embodiment, a special-purpose standard user-file URL may be used to set a cookie rather than to initiate the process of downloading a user file; in such a special-purpose URL, the path portion is a "pseudo file path" that does not identify any file. In one embodiment, to distinguish a pseudo file path from a true file path, the first segment of a pseudo file path begins with a dot, while file and folder names do not begin with a dot. An example of a pseudo-file path 1720 is illustrated below in FIG. 17.

Figure 7:
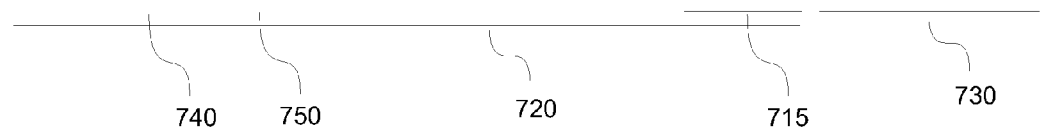
FIG. 7 is an example of an extended user-file URL according to one embodiment.

FIG. 7 shows an example of an extended user-file URL 710, with its hostname portion 720 and its path portion 730, which is a true file path.

The word "extended" in the term "extended user-file URL" denotes the fact that there is information present in the extended user-file URL 710 that is not present in a standard user-file URL such as the URL 610, viz. the "extension" 750. Similarly, the hostname portion 720 is referred to as an "extended user-file hostname" because it contains information not present in a standard user-file hostname, viz. the same extension 750.

In the example, the extension 750 is a random string of 40 hexadecimal digits. (The term "random string" is to be taken in its broadest sense, denoting a string produced by a true hardware-based random number generator or by a pseudo-random number generator with or without entropy accumulator.) In one embodiment, the extension is a random string freshly generated by the application 110 when it receives an original request for a user-file; the extension is thus dependent on the request and therefore on the file; by contrast, the hostname portion 620 of the standard user-file URL 610 of FIG. 6 is not dependent on the user file, being the same for all user files of application instance 42.

The hostname portion 720 also comprises the domain name 715 of the application provider, "pomcor.com" in the example, and a reference to an application instance, viz. an application instance number 740, which, in the example, is again the number "42". Extended user-file URL 710 begins with the string "userfiles", which indicates clearly that such a hostname is used to retrieve a user file. When an HTML user file is displayed by the browser 130, the extended user-file URL of the follow-up user-file request that downloaded the file appears in the address box of the browser. The user 120 can tell that the file being displayed is a user file rather than an application page or a site page by looking at the address box of the browser and seeing the word "userfiles" at the very beginning of the URL.

Figure 8:
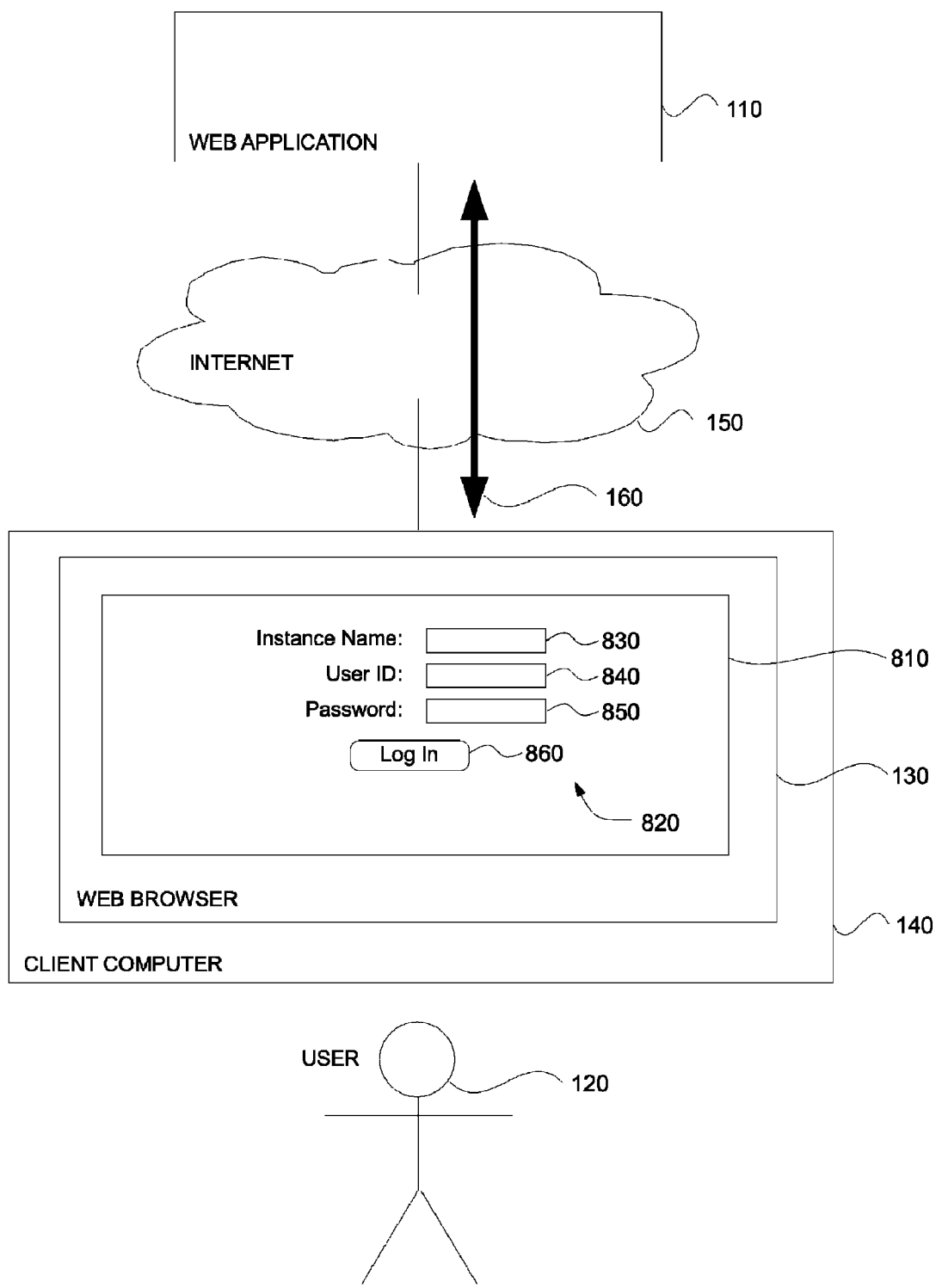
FIG. 8 is a block diagram illustrating the process of logging in to an application instance according to one embodiment.

FIG. 8 shows the user 120 using the browser 130 to log in to an application instance. The user retrieves the login page 810 by issuing a GET request that targets the URL 410 of FIG. 4. The request is sent over the SSL/TLS connection 160 to the application 110 and the application responds by downloading the login page 810 over the connection.

The login page contains a login form 820 where the user enters his/her login credentials. The login credentials include the application instance name, which the user enters in input field 830, the user's user ID, which the user enters in input field 840, and the user's password, which the user enters in input field 850. After entering the credentials, the user clicks on button 860 to submit the form, and the browser 130 issues a POST request to convey the form data to the application, again over an SSL/TLS connection.

Figure 9:
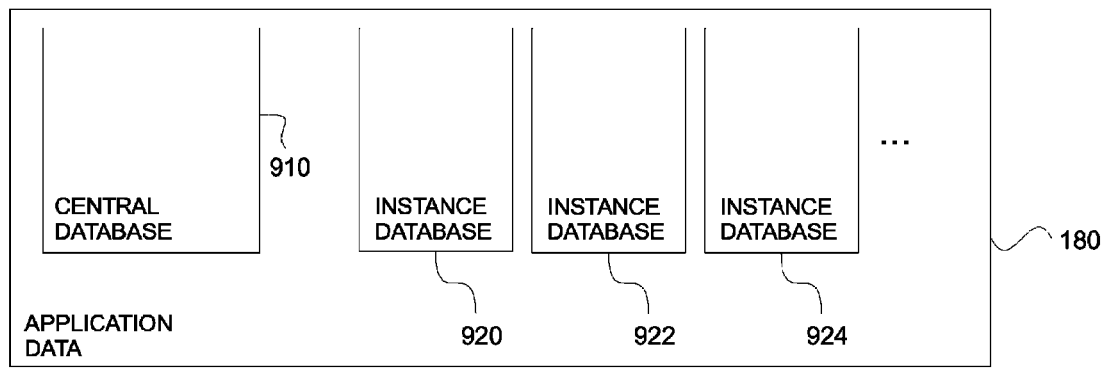
FIG. 9 is a block diagram illustrating the use of relational databases to store application data.

In one embodiment, application data is stored in relational databases. As an illustration, FIG. 9 shows the application data 180 of the Web application 110, comprising a central database 910 and multiple instance databases 920, 922, 924, . . . , one for each application instance.

Figure 10:
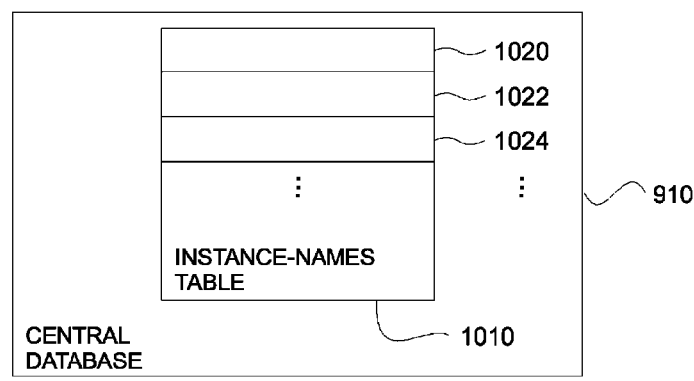
FIG. 10 is a block diagram illustrating a central database comprising an instance-names table.
Figure 11:
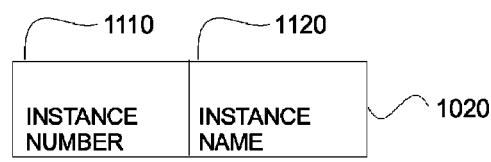
FIG. 11 is a block diagram illustrating an instance-names record according to one embodiment.

According to one embodiment, as illustrated by FIG. 10, the central database 910 contains an instance-names table 1010. The instance-names table 1010 contains instance-name records 1020, 1022, 1024 . . . , one for each application instance. As shown in FIG. 11, an instance-name record 1020 contains an instance-number field 1110 and an instance-name field 1120. The instance-names table 1010 is used to look up the instance name entered by the user in the login form, obtain the corresponding instance number and thereby locate the corresponding instance database.

Figure 12:
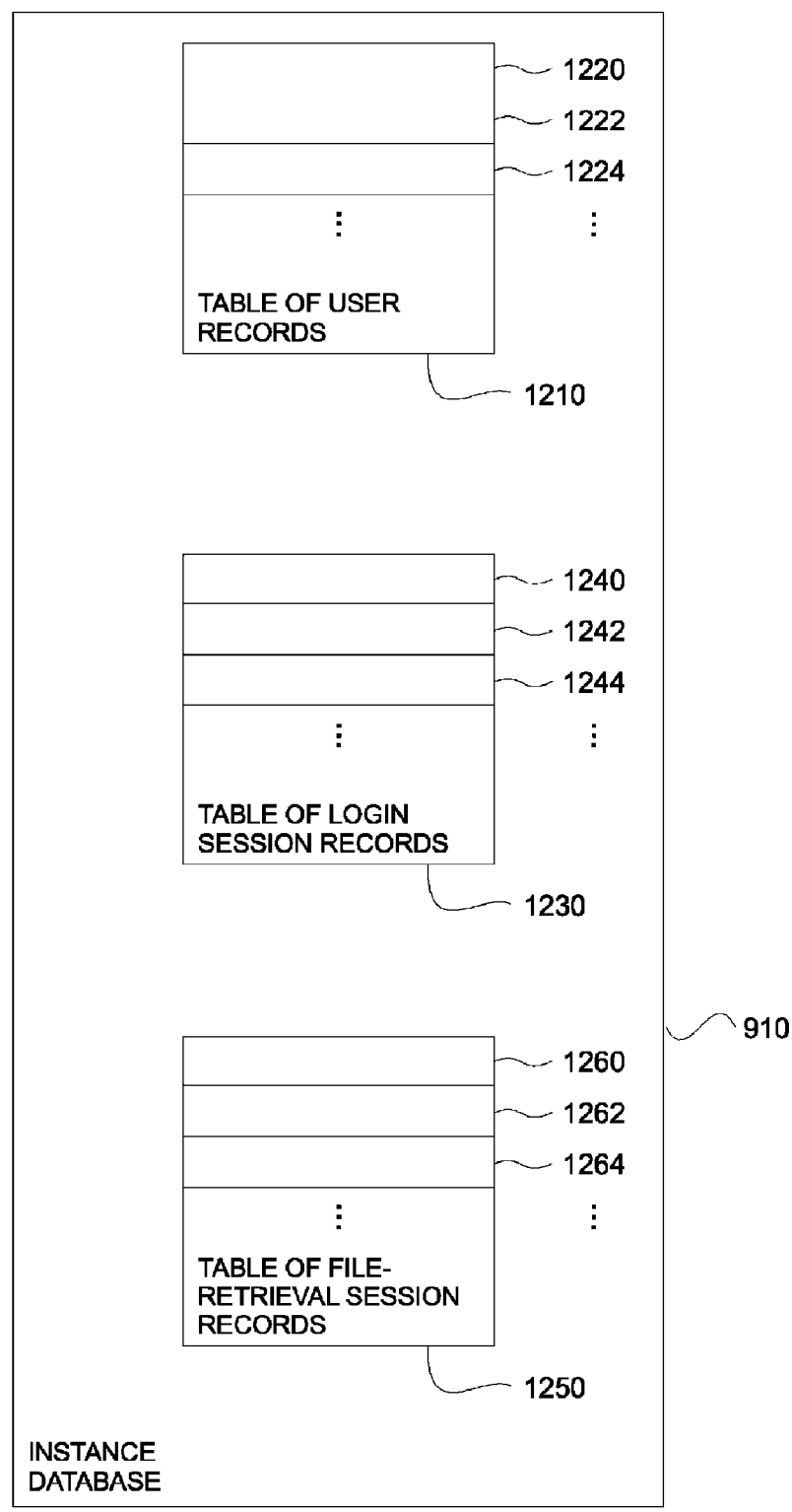
FIG. 12 is a block diagram illustrating an instance database comprising a table of user records, a table of login session records and a table of file-retrieval session records according to one embodiment.

According to one embodiment, as shown in FIG. 12, instance database 920 contains a table 1210 of user records 1220, 1222, 1224, . . . , a table 1230 of login session records 1240, 1242, 1244, . . . , and a table 1250 of file-retrieval session records 1260, 1262, 1264, . . . .

Figure 13:
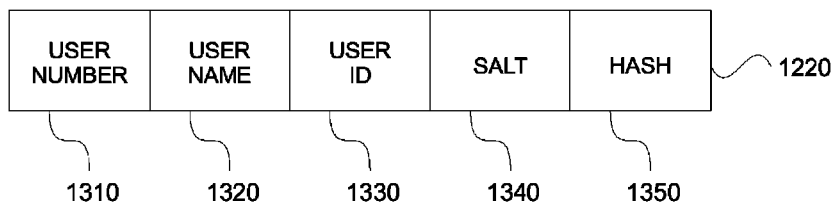
FIG. 13 is a block diagram illustrating a user record according to one embodiment.

A user record present in the database of an application instance represents a current user of the instance. FIG. 13 shows an example of a user record 1220 comprising a field 1310 containing a user number, a field 1320 containing a user name, a field 1330 containing a user ID, a field 1340 containing a salt and a field 1350 containing a cryptographic hash of the concatenation of the salt and the user's password.

Figure 14:
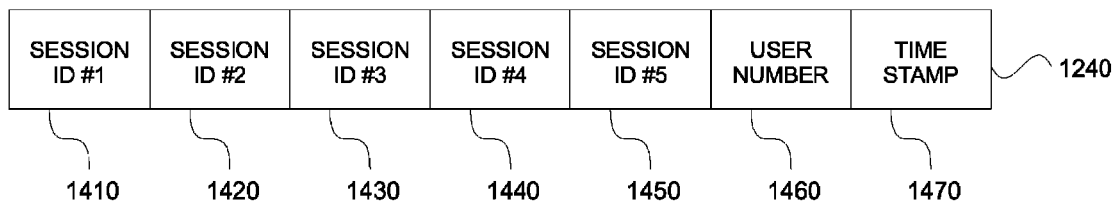
FIG. 14 is a block diagram illustrating a login session record according to one embodiment.

A login session record present in the database of an instance refers to a user record representing a user of the instance and represents a login session of that user; it is created when the user logs in, and deleted when the user logs out. FIG. 14 shows an example of a login session record 1240, comprising five fields 1410, 1420, 1430, 1440 and 1450 that contain random strings, a field 1460 containing the user number of the user, and a field 1470 containing a login-session creation timestamp.

The five random strings are all used as login session IDs to authenticate requests. The first login session ID, stored in field 1410, is placed in a cookie named "A" to authenticate requests that target application-page URLs; it is also used to refer to the login session record from other data records. The second login session ID, stored in field 1420, is placed in a cookie named "B" to authenticate requests that target standard user-file URLs. The third and fourth login session IDs, stored in fields 1430 and 1440 respectively, are used to authenticate two redirection requests during the login process, as described below. The fifth login session ID, stored in field 1450, is used in hidden fields of forms to protect against CSRF, as described below.

Figure 15:
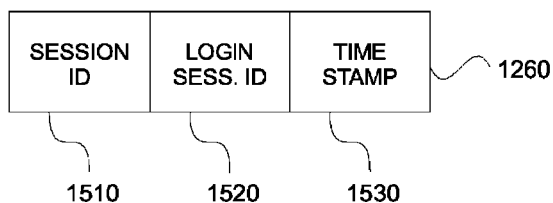
FIG. 15 is a block diagram illustrating a file-retrieval session record according to one embodiment.

A file-retrieval session record 1260, shown in FIG. 15, is created when the application receives an original request for a user file, and deleted when it receives the follow-up request for the same file and downloads the file. It thus represents a file-retrieval session deemed to exist between the two requests. It refers to the login session record used to authenticate the original request. It has a field 1510 that contains a random string used as a file-retrieval session ID, a field 1520 containing the first login session ID stored in field 1410 of the referenced login session record 1240, and a field 1530 containing a file-retrieval session creation timestamp.

Figure 16:
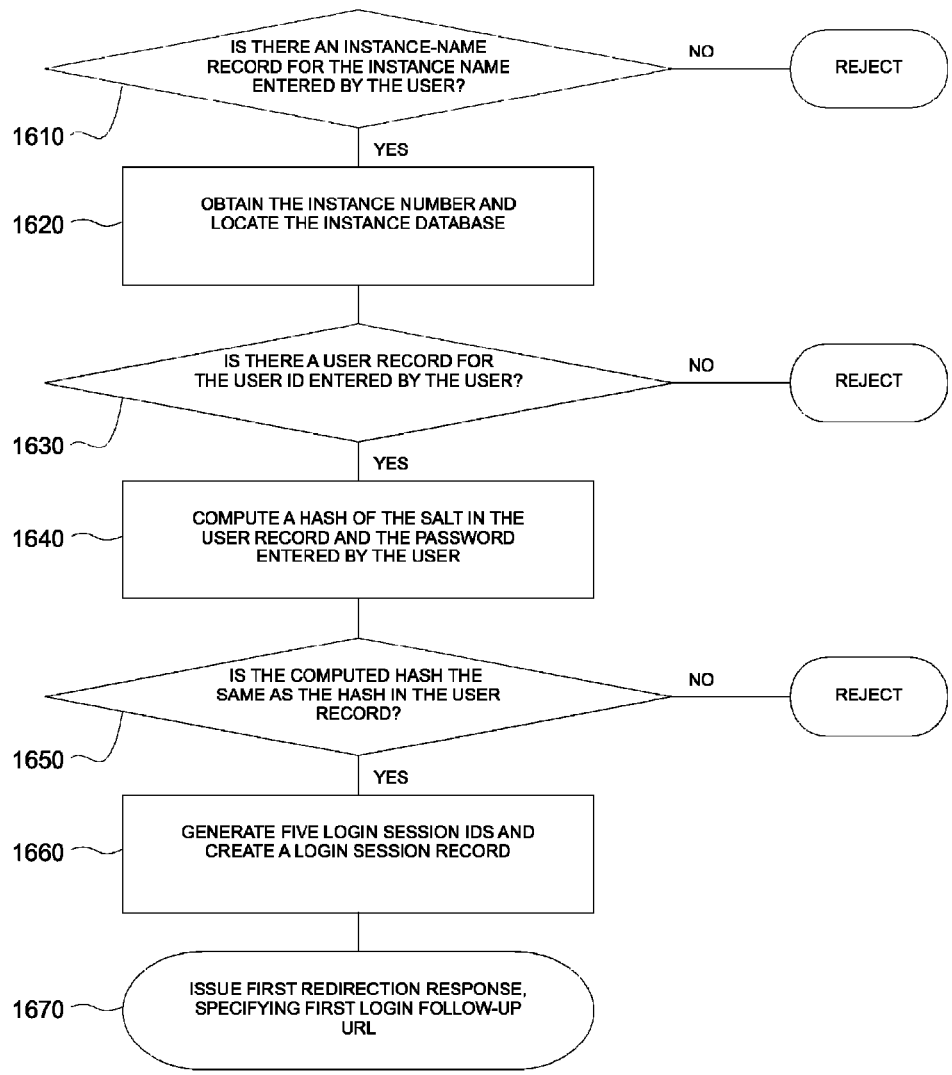
FIG. 16 is a flow diagram illustrating a process followed by a Web application to handle an original login request according to one embodiment.

FIG. 16 shows one embodiment of a process followed by the application 110 to handle a POST request that conveys the data entered by the user in the login form 820 of FIG. 8. Such a request is referred to as an "original login request", the word "original" referring to the fact that the request is redirected as described below.

At 1610, the application looks for an instance-name record 1020 whose instance name field 1120 contains the instance name entered by the user. If there is no such record, the application rejects the request. Otherwise the application proceeds to 1620.

At 1620, the application obtains the instance number from the instance number field 1110 of the instance-name record 1020 and uses it to locate the corresponding instance database. The process of locating the database depends on the particular database management system (DBMS) used to manage the relational databases. For example, if the DBMS is MySQL running on a Unix machine, each database is implemented as a Unix directory within the MySQL data directory. The instance number, say 42, is then embedded in the name of the directory, e.g. "InstanceDB_42", and the application can then locate the database with the MySQL command "use InstanceDB_42"; once this command has been issued, unqualified table and field names in subsequent commands or queries refer to the database of instance number 42.

After locating the instance database the application proceeds to 1630, where it checks if there is a user record in the table of user records of the instance database, such as the record 1220 of FIG. 13, where the user ID field 1330 contains the user ID entered by the user. If there is no such record, the application rejects the request. Otherwise, the application proceeds to 1640.

At 1640, the application obtains the salt from the salt field 1340 of the user record, forms the concatenation of the salt and the password entered by the user, and computes a cryptographic hash of the concatenation using a cryptographic hash function such as one of the five SHA functions published by National Institute of Standards and Technology. The application then proceeds to 1650.

At 1650, the application compares the hash computed at 1640 to the hash contained in field 1350 of the user record. If they are not the same, the application rejects the request. Otherwise, the application proceeds to 1660.

At 1660 the application generates five random strings to be used as first through fifth login session IDs, and creates a login session record, placing the first through fifth session IDs in fields 1410, 1420, 1430, 1440 and 1450, the user number found in field 1310 of the user record in field 1460 and a timestamp denoting the present date and time in field 1470. The application then proceeds to 1670.

At 1670, the application responds to the login request with a first redirection response (using a 302 HTTP status code) that tells the browser to issue a follow-up request (the "first login follow-up request") targeting a URL specified in the Location HTTP header of the response (the "first login follow-up URL").

This redirection enables the application to set a cookie whose domain is the standard user-file hostname of the application instance to which the user is logging in. To achieve this purpose, the first login follow-up URL is a standard user-file URL whose hostname portion is the standard user-file hostname of the application instance. The URL has a pseudo file path that does not refer any user file.

Figure 17:
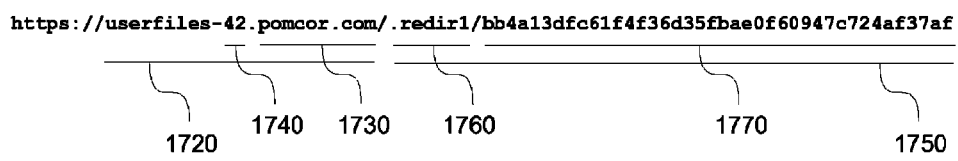
FIG. 17 is an example of a first login follow-up URL according to one embodiment.

An example of a first login follow-up URL 1710 is shown in FIG. 17. The hostname portion 1720 of the URL includes the domain name 1730 of the application provider, "pomcor.com" in the example, as well as the application instance number 1740, "42" in the example. It coincides with the hostname portion 620 of the standard user-file URL 610 of FIG. 6, which is the standard user-file hostname of instance 42. The path portion 1750 is a pseudo file path with two segments. The first segment 1760 begins with a dot to identify the path as a pseudo file path. The second segment 1770 authenticates the first login follow-up request and associates it with a login session by specifying the value of the third login session ID of the login session record, the one stored in field 1430. In the example, the third login session ID shown in the second segment 1770 is a random 40-digit hexadecimal number.

Figures 18, 19, 20:
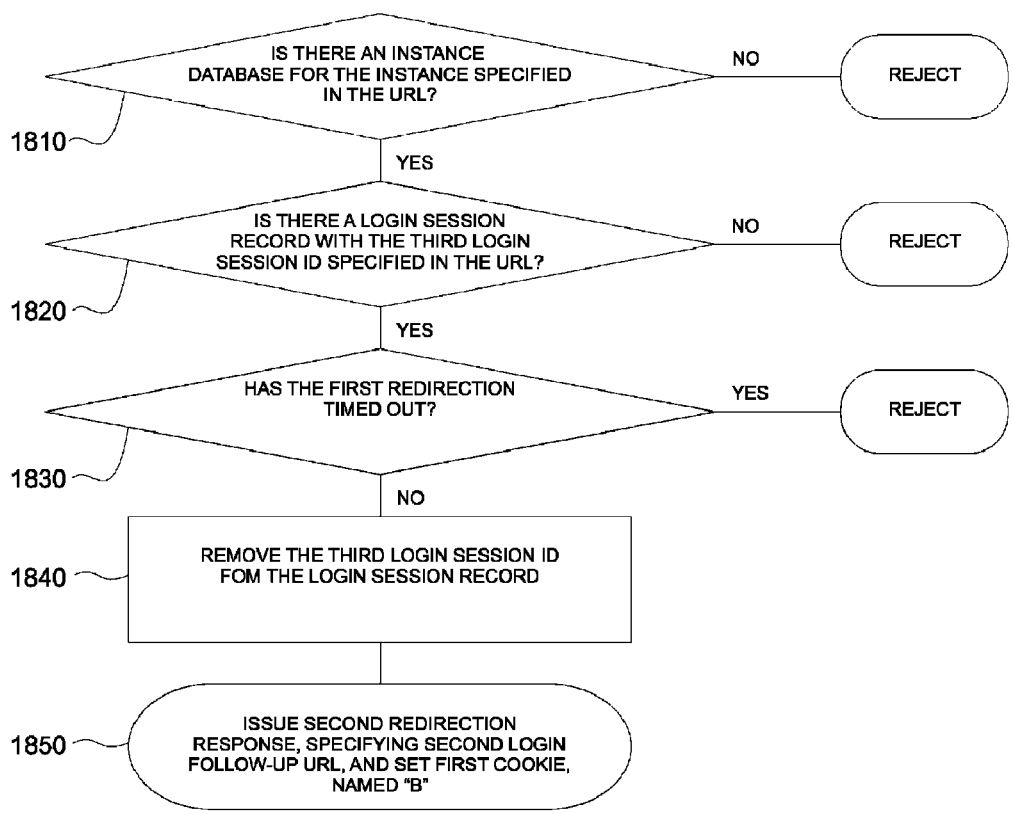
FIG. 18 is a flow diagram illustrating a process followed by a Web application to handle a first login follow-up request according to one embodiment.
FIG. 19 is an example of an HTTP header that sets a first cookie, named "B", according to one embodiment.
FIG. 20 is an example of a second login follow-up URL according to one embodiment.

FIG. 18 shows one embodiment of a process followed by the application 110 to handle a first login follow-up request, such as, for example, a request that targets the standard user-file URL 1710 of FIG. 17. The hostname portion 1720 of the URL is a standard user-file hostname that specifies an application instance number 1740, "42" in the example. At 1810, the application tries to locate an instance database for the application instance identified by the instance number, i.e. for instance 42. If there is no such database, the application rejects the request. Otherwise, the application proceeds to 1820.

At 1820, the application checks if there is a login session record in the table of login session records of the instance database, such as the record 1240 shown in FIG. 14, where the third login session ID field 1430 contains the random string specified by the second segment 1770 of the path of the first login follow-up URL. If there is no such record, the application rejects the request. Otherwise, the application proceeds to 1830.

At 1830, the application checks if the first redirection after login has exceeded a redirection timeout, based on the value of the timestamp stored in field 1470 of the login session record. The timeout is set to a value that allows ample time for one redirection to take place under normal circumstances, say one minute. If the timeout has been exceeded, the application rejects the request. Otherwise, the application proceeds to 1840.

At 1840, the application removes the third login session ID from field 1430 of the login session record, by assigning NULL to the field. The application then proceeds to 1850.

At 1850, the application responds to the first login follow-up request with a second redirection response (again using a 302 HTTP status code) that tells the browser to issue a second login follow-up request that targets a second login follow-up URL specified in the Location HTTP header of the response. The response sets a first cookie, with name "B", whose value is the second login session ID of the login session record, the one stored in field 1420. The cookie is set in the user's browser by including an HTTP "Set-Cookie" header in the response.

FIG. 19 shows an example of such a header 1910. The name 1920 of the cookie is the string "B" and the value 1930 of the cookie is the second login session ID. The cookie has a "secure" attribute 1940 that instructs the browser to send the cookie only over SSL/TLS connections, and an "httponly" attribute 1950 that instructs the browser to not make the cookie available to client-side code. The cookie does not have an "expires" attribute; this means that it is a temporary cookie that will cease to exist when the browser is closed. The cookie does not have a "domain" attribute. This is equivalent to setting the domain of the cookie to the hostname portion of the URL of the request that triggered the response; the request is the first login follow-up request, and the hostname is the standard user-file hostname of the application instance. Thus the browser will send cookie "B" along with original user-file requests that target the same application instance, since such requests use the standard user-file hostname of the instance.

The second login follow-up URL is an application-page URL, whose hostname is an application-page hostname. An example of a second login follow-up URL 2010 is shown in FIG. 20. The hostname portion 2020 of the URL includes the domain name 2030 of the application provider, "pomcor.com" in the example, as well as the application instance number 2040, "42" in the example. The path portion 2050 has two segments. The first segment 2060 identifies the request as a second login follow-up request, which leads to the Welcome page. The second segment 2070 authenticates the request and associates it with a login session by specifying the value of the fourth login session ID of the login session record, the one stored in field 1440. In the example, the fourth login session ID placed in the second segment 2070 is a random 40-digit hexadecimal number.

Figures 21, 22:
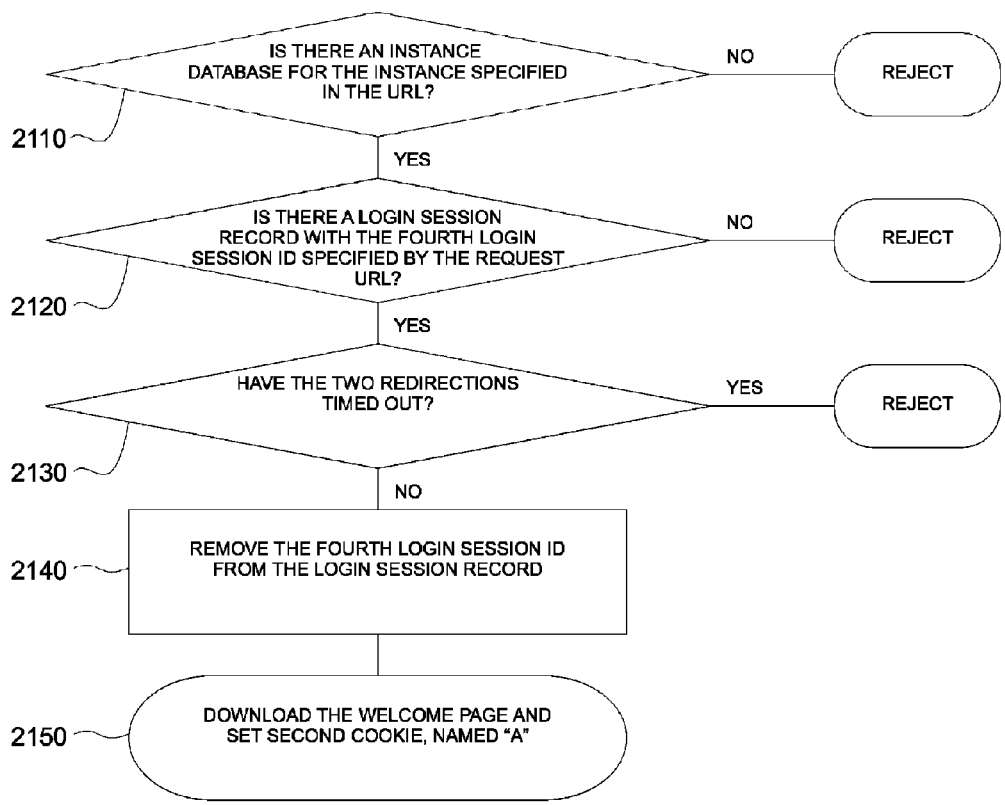
FIG. 21 is a flow diagram illustrating a process followed by a Web application to handle a second login follow-up request according to one embodiment.
FIG. 22 is an example of an HTTP header that sets a second cookie, named "A", according to one embodiment.

FIG. 21 shows one embodiment of a process followed by the application to handle a second login follow-up request. The URL of such a request is an application-page URL, such as the one shown in the example of FIG. 20. The hostname portion of the URL is an application-page hostname that specifies an application instance number. At 2110, the application tries to locate an instance database for the application instance identified by the specified application instance number. If there is no such database, the application rejects the request. Otherwise, the application proceeds to 2120.

At 2120, the application checks if there is a login session record in the table of login session records of the instance database, such as the record 1240 shown in FIG. 14, where the fourth login session ID field 1440 contains the random string specified by the second segment 2070 of the second login follow-up request URL. If there is no such record, the application rejects the request. Otherwise, the application proceeds to 2130.

At 2130, the application checks if the first and second redirections together have exceeded a two-redirection timeout, based on the value of the timestamp stored in field 1470 of the login session record. The timeout is set to a value that allows ample time for two redirections to take place under normal circumstances, say two minutes. If the timeout has been exceeded, the application rejects the request. Otherwise, the application proceeds to 2140.

At 2140, the application removes the fourth login session ID from field 1440 of the login session record, by assigning NULL to the field. The application then proceeds to 2150.

At 2150, the application responds to the second login follow-up request by downloading a Welcome page and setting a second cookie, with name "A", whose value is the first login session ID of the login session record, the one stored in field 1410. The cookie is set in the user's browser by including an HTTP "Set-Cookie" header in the response. FIG. 22 shows an example of such a header, which differs from the Set-Cookie header of FIG. 19 only by the name 2210 and the value 2220 of the cookie. As in FIG. 19, the cookie does not have a "domain" attribute. This is equivalent to setting the domain of the cookie to the hostname portion of the request that triggered the response; that request is the second login follow-up request, and its hostname portion is the application-page hostname of the application instance. Thus the browser will send cookie "A" along with application-page requests that target the same application instance, since such requests use the application-page hostname of the instance.

Figure 23:
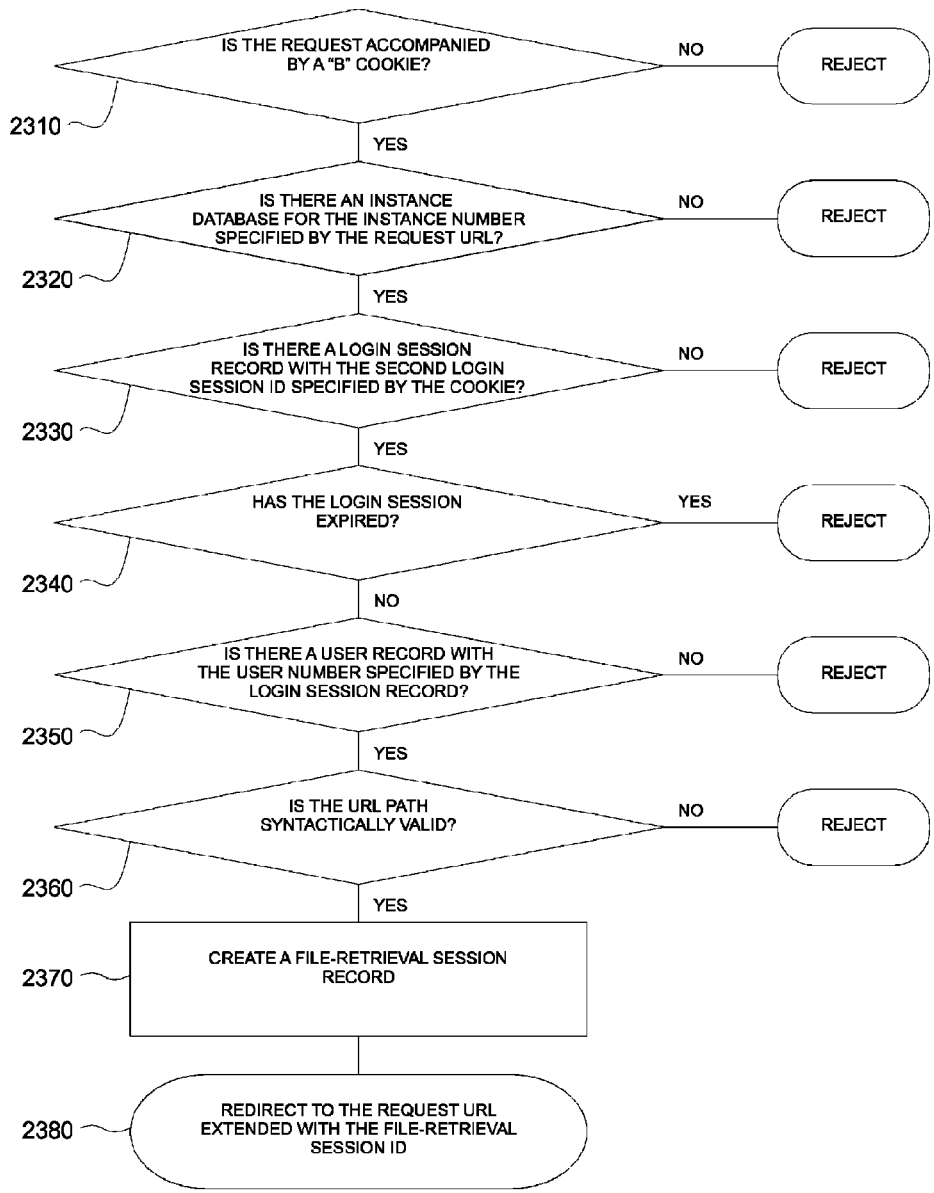
FIG. 23 is a flow diagram illustrating a process followed by a Web application to handle an original user-file request according to one embodiment.

FIG. 23 shows one embodiment of a process followed by the application 110 to handle a request whose URL is a standard user-file URL with a path portion that is a true file path, such as the URL 610 of FIG. 6. Such a request is sent by a user's browser when making an original user-file request.

At 2310 the application checks if the request is accompanied by a cookie with name "B", such as the cookie 1910 of FIG. 19. If not, the application rejects the request. Otherwise, the application proceeds to 2320.

The URL of the request specifies an application instance number 640. At 2320 the application tries to locate an instance database for the application instance identified by the specified instance number. If there is no such database, the application rejects the request. Otherwise, the application proceeds to 2330.

At 2330 the application checks if there is a login session record in the table of login session records of the instance database, such as the record 1240 shown in FIG. 14, where the second login session ID field 1420 is equal to the value of the cookie found in step 2310. If not, the application rejects the request. Otherwise, the application proceeds to 2340.

At 2340 the application checks if the login session record found in step 2330 has expired, based on the timestamp in field 1470 of the record and one or more session expiration settings. In one embodiment, session expiration settings are application and user dependent, and change from time to time. If the login session has expired, the application rejects the request. Otherwise, the application proceeds to 2350.

At 2350 the application obtains the user number from field 1460 of the login session record found in step 2330, and checks if it still refers to an existing user record. If not, the application rejects the request. Otherwise, the application proceeds to 2360.

At 2360 the application checks if the path portion 630 of the request URL is a syntactically valid true file path. To be syntactically valid, the path must be properly URL-encoded, and folder and file names must obey syntactic rules set by the application. In one embodiment, one such rule requires that the path not begin with a dot. If the path is not syntactically valid, the application rejects the request. Otherwise, the application proceeds to 2370.

At 2370 the application generates a random string for use as a file-retrieval session ID, and creates a file-retrieval session record, such as the record 1260 shown in FIG. 15, with the file-retrieval session ID in field 1510, the first login session ID of the login session record found in step 2330 in field 1520, and a timestamp denoting the current date and time in field 1530. The application then proceeds to 2380.

At step 2380 the application constructs an extended user-file hostname by concatening a dash ("-") and the file-retrieval session ID generated in step 2370 to the hostname portion of the request URL, and an extended user-file URL by concatening the path portion of the request URL to the extended user-file hostname. (FIG. 7 illustrates such an extended user-file hostname 720 and extended user-file URL 710, the extension 750 illustrating the file-retrieval session ID.) The application then issues a redirection response (using a 302 HTTP status code) with the extended user-file URL as the value of a Location header. This causes the browser to issue a follow-up user-file request that targets the extended user-file URL.

Figure 24:
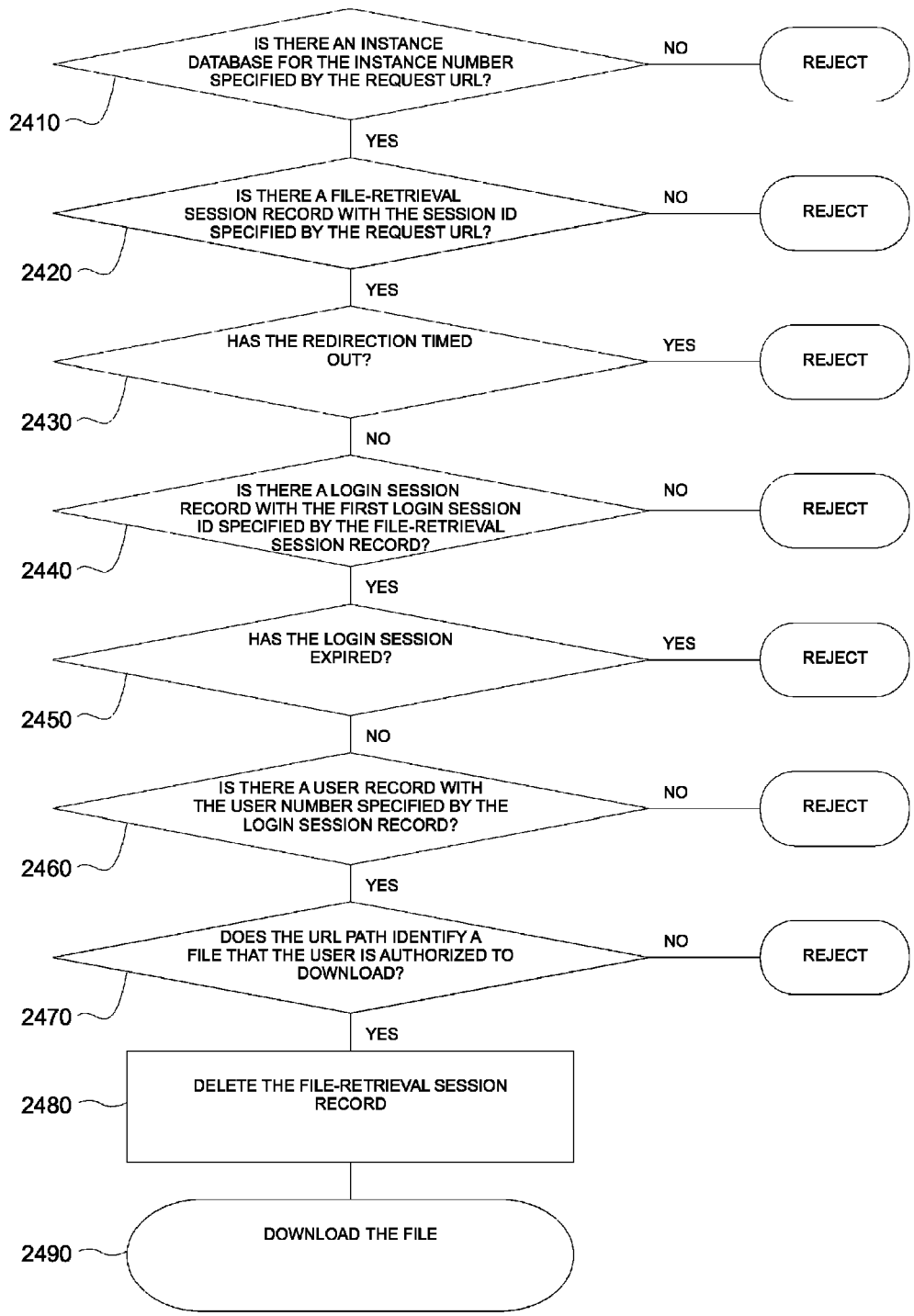
FIG. 24 is a flow diagram illustrating a process followed by a Web application to handle a follow-up user-file request according to one embodiment.

FIG. 24 shows one embodiment of a process followed by the application 110 to handle a request whose URL is an extended user-file URL, such as the URL 710 of FIG. 7. Such a request is sent by a user's browser when making a follow-up user-file request.

The hostname portion 720 of the request URL 710 is an extended user-file hostname that specifies an application instance number 740. At 2410 the application tries to locate an instance database for the application instance identified by that instance number. If there is no such database, the application rejects the request. Otherwise, the application proceeds to 2420.

At 2420 the application checks if there is a file retrieval session record in the table of file-retrieval session records of the instance database, such as the record 1260 of FIG. 15, where the file-retrieval session ID field 1510 contains the extension 750 of the extended user-file hostname 720. If not, the application rejects the request. Otherwise, the application proceeds to 2430.

At 2430, the application checks if the redirection of the original user-file request has exceeded a redirection timeout, based on the value of the timestamp stored in field 1530 of the file-retrieval session record. The timeout is set to a value that allows ample time for one redirection to take place under normal circumstances, say one minute. If the timeout has been exceeded, the application rejects the request. Otherwise, the application proceeds to 2440.

At 2440, the application checks if there is a login session record in the table of login session records of the instance database, such as the record 1240 shown in FIG. 14, where the first login session ID field 1410 has the same value as the field 1520 of the file-retrieval session record 1260 found in step 2420. If not, the application rejects the request. Otherwise, the application proceeds to 2450.

At 2450 the application checks if the login session record 1240 determined at 2440 has expired, based on the timestamp in field 1470 and on one or more session expiration settings; in one embodiment, session expiration settings are application and user dependent, and change from time to time. If it has expired, the application rejects the request. Otherwise, the application proceeds to 2460.

At 2460 the application obtains the user number from field 1460 of the login session record 1240 determined at 2440, and checks if it still refers to an existing user record. If not, the application rejects the request. Otherwise, the application proceeds to 2470.

At 2470 the application checks if the path portion 730 of the request URL 710 identifies an existing user file in the file repository of the application instance that the user with the user number obtained at 2460 is authorized to download. If not, the application rejects the request. Otherwise, the application proceeds to 2480.

At 2480, the application deletes the file-retrieval session record 1260 determined at 2420 and proceeds to 2490.

At 2490 the application downloads the file identified at 2470.

There are two kinds of application-page requests: a request with side effects, and a request without side effects.

In one embodiment, a request without side effects is a GET request that asks the application to display application instance data extracted from the application instance database, without modifying the database. For example, the request whose URL is shown in FIG. 5 is a request without side effects that asks the application to display the list of files present in the file repository of application instance 42.

In one embodiment, a request with side effects is a POST request, sent by the user's browser when the user submits a form that asks the application to perform an action that may result in a modification of the application instance. Examples of such requests are a request to reset a user's password, or a request to upload a file.

Either kind of request uses an application-page URL, such as illustrated in FIG. 5. In one embodiment, the path portion 540 determines whether the request does not have side effects and is expected to be a GET request, or has side effects and is expected to be a POST request.

Figure 25:
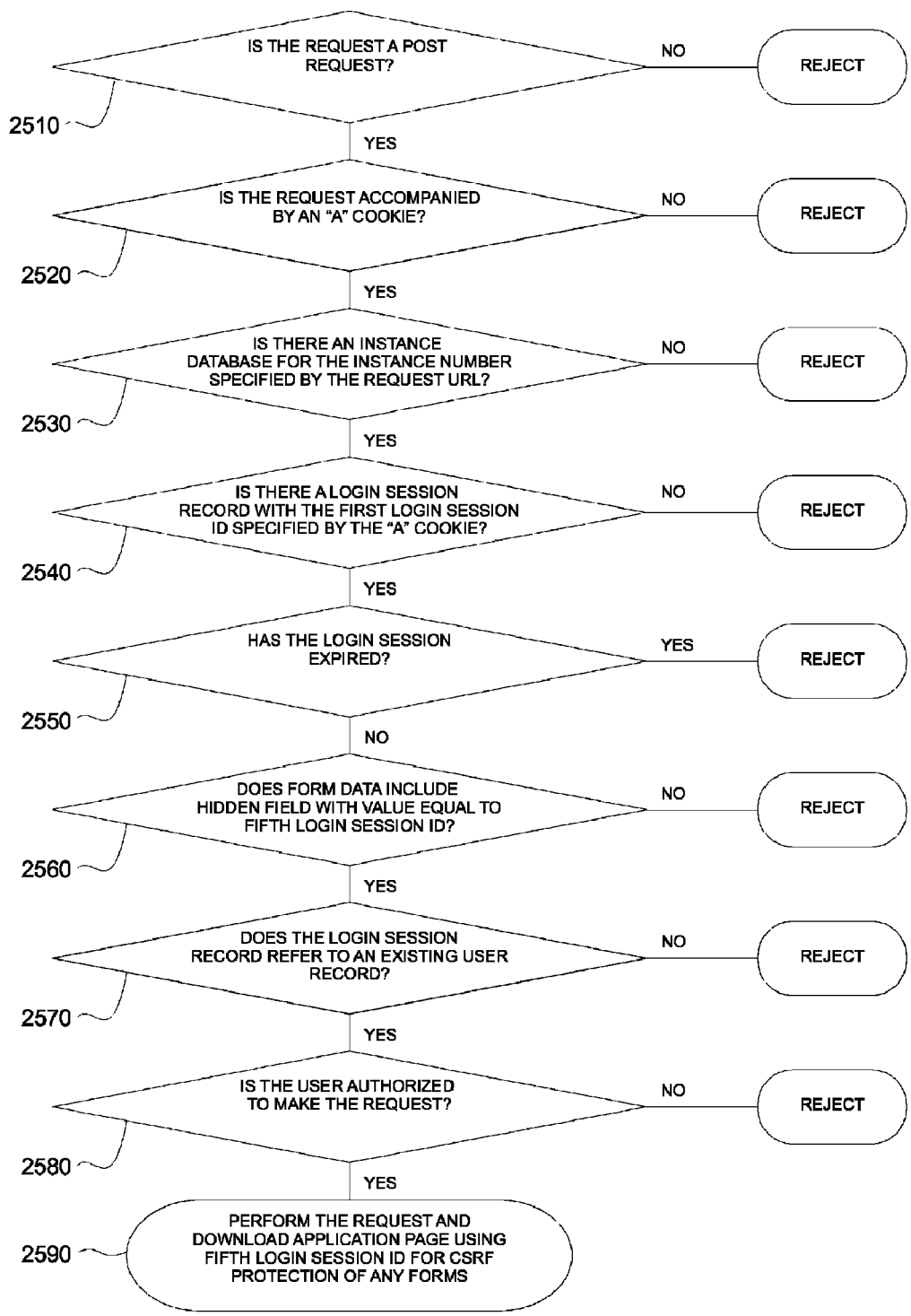
FIG. 25 is a flow diagram illustrating a process followed by a Web application to handle an application-page request with side effects according to one embodiment.

FIG. 25 shows one embodiment of a process followed by the application 110 to handle an application-page with side effects.

At 2510 the application checks if the request is a POST request. If not, the application rejects the request. Otherwise, the application proceeds to 2520.

At 2520 the application checks if the request is accompanied by a cookie with name "A". If not, the application rejects the request. Otherwise, the application proceeds to 2530.

At 2530 the application tries to locate an instance database for the application instance identified by the instance number 530 contained in the request URL. If there is no such database, the application rejects the request. Otherwise, the application proceeds to 2540.

At 2540, the application checks if there is a login session record in the table of login session records of the instance database, such as the record 1240 shown in FIG. 14, where the first login session ID field 1410 contains the value of the cookie of step 2520. If not, the application rejects the request. Otherwise, the application proceeds to 2550.

At 2550 the application checks if the login session record 1240 determined at 2540 has expired, based on the timestamp in field 1470 and on one or more session expiration settings. In one embodiment, session expiration settings are application and user dependent and change from time to time. If it has expired, the application rejects the request. Otherwise, the application proceeds to 2560.

At 2560 the application checks if the request has a body containing form data, and if the form data includes a hidden field for protection against CSRF whose value is equal to the fifth login session ID stored in field 1450 of the login session record 1240 determined at 2540. If not, the application rejects the request. Otherwise, the application proceeds to 2570.

At 2570 the application obtains the user number from field 1460 of the login session record 1240 determined at 2540, and checks if it still refers to an existing user record. If not, the application rejects the request. Otherwise, the application proceeds to 2580.

At 2580 the application checks if the user identified by the user number obtained at 2570 is authorized to make the request specified by the path portion of the URL. If not, the application rejects the request. Otherwise, the application proceeds to 2590.

At 2590 the application performs the request and responds by downloading an application page. The application page contains zero or more forms. Each of those forms includes a hidden field for protection against CSRF. The application uses the fifth login session ID stored in field 1450 of the login session record 1240 determined at 2540 as the value of each of those hidden fields.

According to one embodiment, the process used for handling an application-page request without side effects is the same as the process described by FIG. 25, except that the application checks for a GET request rather than for a POST request as described at 2510 and the process of 2560 is omitted.

The embodiments described herein provide at least the following benefits.

Protection is provided against cross-user spoofing attacks by the fact that the hostname portion of a user-file URL begins with a string such as "userfiles"; site URLs and application-page URLs, on the other hand, begin with strings such as "site" and "application" that are not easily confused with a string such as "userfiles". When the contents of a user file are displayed by the browser, the address box of the browser displays the extended user-file URL, allowing a cautious user to detect a spoofing attempt by observing the string "userfiles" as a user file is masquerading as an application page or a site page.

Protection is provided against cross-user scripting attacks. Client-side code embedded in a user file originates, for the purpose of the same-origin policy, from the domain defined by the extended user-file hostname of the follow-up user-file request. This hostname includes both an application instance number and a random string that plays a dual role as a file-dependent hostname extension and a file-retrieval session ID. Malicious client-side code in a user file cannot access the contents of application pages, because an application page and a user file have different hostnames. It cannot access the contents of user files belonging to a different application instance, because of the presence of the instance number in the hostname. If the file-dependent extension is a random number with enough entropy, the malicious code cannot access the contents of other user files belonging to the same application instance, because the file-dependent hostname extension is unique with high probability.

It should be observed that the same-origin policy does not prevent JavaScript code from downloading content from a different origin; rather, it prevents JavaScript code from inspecting such content once it has been downloaded. Thus if user Alice downloads a user-file containing malicious client-side code planted by current or former user Eve, the malicious code is able to download other user files belonging to the same application instance including protected files that Eve is not authorized to access; and if Alice is simultaneously logged in to a second application instance, the malicious code may also download user files from the second instance. However, it is not able to inspect downloaded user files, other than the one in which it is embedded. Thus, it is not able to send Eve the contents of protected files, nor the contents of user files belonging to the second instance; this is how the embodiments provide protection against "protected file attacks" and "cross-instance attacks" respectively. And, after Eve's user account is terminated, the malicious code cannot send to Eve the contents of user files besides the one containing the malicious code, which was uploaded by Eve herself before her termination; this is how the present embodiments provide protection against "ex-user scripting attacks".

Similarly, the malicious code can issue successful application-page requests without side effects against the same application instance; and against any other instance that Alice may be logged in to; but it cannot inspect the application pages downloaded in response to the requests. The malicious code can also issue application-page requests with side effects, but they will not succeed because the malicious code cannot supply the fifth login session ID that must included in the request as the value of a hidden field that provides protection against CSRF. The fifth login session ID can only be obtained from an application page, and the malicious code cannot inspect application pages. This is how the embodiments described herein provide protection against "cross-user impersonation attacks".

In addition to the above-described security benefits, the embodiments described herein also provide important usability benefits.

Protection against malicious code relies on the same-origin policy rather than on the types of files that are shared, or whether shared files are displayed by the browsers. Hence there is no need to restrict the types of files that can be stored in a repository, and browsers can be allowed to display files as they are downloaded. Indeed, protection is provided while allowing malicious code to be present in shared files, allowing shared files with malicious code to be displayed by the browser, and allowing the malicious code to be executed by the browser.

Other usability benefits derive from the use of a standard user-file URL as the address of an original user-file request, before redirection. Because the standard URL of a user file is short and contains no random strings or other authentication information, it can be easily remembered and conveniently used to construct links to the file. Furthermore, because its hostname portion is not file-dependent, i.e. because it is the same for all files stored in the file repository of an application instance, those files can refer to each other using relative URLs. This makes it easy to build a private Web site, accessible only to users of an application instance, by uploading to the file repository of the instance a collection of HTML files that have links to each other as well as to other files stored in the repository.

As an additional benefit, the malicious code cannot steal the "A" cookie or the "B" cookie of the same or any other application instance, even if Alice's browser is an older one that ignores the "httponly" cookie attribute. This is because client-side code only has access to cookies associated with the same domain as, or a superdomain of, the domain from which it originates. The malicious code originates from the domain defined by an extended user-file hostname, while the "B" cookie is associated a domain defined by a standard user-file hostname, and the "A" cookie is associated with a domain defined by an application-page hostname, neither of which is equal to, or a superdomain of, a domain defined by an extended user-file hostname.

Yet another benefit is that the application is more resilient to XSS flaws that may be present accidentally in application code. By including an instance number in an application-page hostname, the embodiments prevent such a flaw from being exploited to attack a different application instance.

Finally, all requests are authenticated, including requests to download user files. A login request is authenticated by the credentials entered by the user on the login form. A first login follow-up request is authenticated by the third login session ID embedded in the path portion of the request URL. A second login-follow-up request is authenticated by the fourth login session ID embedded in the path portion of the request URL. An original user-file request is authenticated by the second login session ID conveyed by the "B" cookie. A follow-up user-file request is authenticated by the file-retrieval session ID used as the extension of the extended user-file URL of the request. An application-page request without side effects is authenticated by the first login session ID conveyed by the "A" cookie. An application-page request with side effects is also authenticated by the first login session ID conveyed by the "A" cookie, and further validated by the fifth login session ID included as the value of a hidden field for protection against CSRF.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein.

What is claimed is:

1. A method of protecting a Web application against attacks from malicious client-side code in a first shared file of a first application instance of the Web application, as the first shared file is downloaded by the Web application to a user's browser in a response to a download request from the user's browser, the method comprising:

the user's browser sending the download request to the Web application, the download request specifying, as a Web address of a file to be downloaded, a user file URL of the first shared file, the user file URL having a hostname portion that includes a differentiating string not found in hostname portions of application page URLs, the hostname portion of the user file URL of the first shared file further including a reference to the first application instance; and the Web application downloading the first shared file to the user's browser, malicious client-side code in the first shared file being prevented by a same-origin policy enforced by the user's browser from accessing content of application pages of the Web application, as a result of application pages having a different origin than the first shared file due to the presence of the differentiating string in the hostname portion of the user file URL of the first shared file, and said malicious client-side code being further prevented from accessing content of shared files of other application instances of the Web application, as a result of the first shared file having a different origin than shared files of other application instances due to the presence of the reference to the first application instance in the hostname portion of the user file URL of the first shared file.

2. The method of claim 1, further comprising:
preventing the first shared file from masquerading as an application page by including as the differentiating string in the hostname portion of the user file URL of the first shared file a string meaningful to the user indicating that the hostname is used to retrieve a user file rather than an application page.

3. The method of claim 1, where the user file URL of the first shared file is an extended user file URL whose hostname portion is dependent on the first shared file.

4. The method of claim 3, where the hostname portion of the extended user file URL contains a file-dependent hostname extension unique to the first shared file, malicious client-side code in the first shared file being prevented by the same-origin policy from accessing the contents of other shared files, as a result the first shared file having a different origin than other shared files due to the presence of the file-dependent hostname extension unique to the first shared file in the hostname portion of the extended user file URL.

5. The method of claim 3, where the extended user file URL contains a file-retrieval session ID that authenticates the download request.

6. The method of claim 5, where the browser makes the download request following a redirect response to an original user file request for the first shared file, the original user file request being addressed to a standard user-file URL having a hostname portion that is independent of the first shared file.

7. The method of claim 6, where the original user file request is authenticated by a first cookie.

8. The method of claim 7, where the first cookie is set in a response to a first login follow-up request, the first login follow-up request being sent following a first redirection response after login and targeting a first login follow-up URL whose hostname portion is a standard user-file URL.

9. The method of claim 8, where the response to the first login follow-up request is a second redirection response that tells the browser to issue a second login follow-up request that targets a second login follow-up URL whose hostname portion is an application-page hostname, the response to the second login follow-up request setting a second cookie that the browser later sends along with application-page requests and the application uses to authenticate the application-page requests.

10. A Web application having a file sharing feature, comprising:
a file repository;
one or more front servers configured to download a first shared file of a first application instance of the Web application to a user's browser upon receiving a download request from the user's browser, the download request using as Web address of the first shared file a user file URL, the user file URL having a hostname portion that includes a differentiating string not found in hostname portions of application page URLs, the hostname portion of the user file URL further containing a reference to the first application instance, malicious client-side code in the first shared file being prevented by a same-origin policy enforced by the user's browser from accessing content of application pages as a result of the first shared file having a different origin than application pages due to the presence of the differentiating string in the hostname portion of the user file URL of the first shared file, and said malicious client-side code being further prevented from accessing content of shared files of other application instances of the Web application as a result of the first shared file having a different origin than shared files of other application instances due to the presence of the reference to the first application instance in the hostname portion of the user file URL of the first shared file.

11. The Web application of claim 10, where the differentiating string in the hostname portion of the user file URL of the first shared file is a string meaningful to the user indicating that the hostname is used to retrieve a user file rather than an application page.

12. The Web application of claim 10, where the user file URL is an extended user file URL whose hostname portion contains a file-dependent hostname extension unique to the first shared file, malicious client-side code in the first shared file being prevented by a same-origin policy enforced by the user's browser from accessing the contents of other shared files as a result of the first shared file having a different origin than other shared files due to the presence of the file-dependent hostname extension unique to the first shared file in the hostname portion of the extended user file URL.

13. The Web application of claim 12, where the extended user file URL contains a file-retrieval session ID that authenticates the download request.

14. The Web application of claim 13, further comprising one or more front servers configured to respond to an original user file request to download the first shared file to the user's browser by redirecting the browser to the extended user file URL, the original user file request being addressed to a standard user-file URL having a hostname portion that is independent of the first shared file.

15. The Web application of claim 14, where the front servers configured to respond to an original user file request rely on a first cookie to authenticate the original user file request.

16. The Web application of claim 15 further comprising one or more front servers configured to set the first cookie in a response to a first login follow-up request, the first login follow-up request being sent following a first redirection response after login and targeting a first login follow-up URL whose hostname portion is a standard user-file URL.

17. The Web application of claim 16 where the response to the first login follow-up request is a second redirection response that tells the browser to issue a second login follow-up request that targets a second login follow-up URL whose hostname portion is an application-page hostname, the Web application further comprising a set of one or more front servers configured to set a second cookie in a response to the second login follow-up request, the second cookie later being sent by the browser along with application-page requests and used by the application to authenticate the application-page requests.

* * * * *